United States Patent [19]

Blom et al.

[11] Patent Number: 5,452,565
[45] Date of Patent: Sep. 26, 1995

[54] DEVICE FOR WRAPPING AND WELDING UNDER VACUUM, USED IN THE MANUFACTURE OF A THERMALLY INSULATED CONTAINER

[75] Inventors: Anders Blom, Gällivare; Jarl Gustavsson, Hakkas, both of Sweden

[73] Assignee: Thermopac AB, Sweden

[21] Appl. No.: 290,973

[22] PCT Filed: Feb. 24, 1992

[86] PCT No.: PCT/SE92/00109
§ 371 Date: Aug. 24, 1994
§ 102(e) Date: Aug. 24, 1994

[87] PCT Pub. No.: WO93/16922
PCT Pub. Date: Sep. 2, 1993

[51] Int. Cl.[6] .................................................. B65B 31/02
[52] U.S. Cl. ............................ 53/510; 53/141; 53/174; 53/176; 53/281; 53/432
[58] Field of Search .......................... 53/510, 511, 174, 53/176, 170, 281, 284.5, 141, 432

[56] References Cited

U.S. PATENT DOCUMENTS

| | | | |
|---|---|---|---|
| 3,423,817 | 1/1969 | Bobo | 53/432 |
| 3,926,306 | 12/1975 | Van Nederveen | 53/432 |
| 4,581,804 | 4/1986 | McLaughlin | 53/432 |
| 4,862,674 | 9/1989 | Lejondahl et al. | 53/432 |

Primary Examiner—John Sipos
Assistant Examiner—Ed Tolan
Attorney, Agent, or Firm—D. Peter Hochberg; Mark Kusner; Michael Jaffe

[57] ABSTRACT

Method and device for manufacturing a thermally insulated container (1) for storing and transporting material such as vaccine, biological material and the like requiring a substantial constant temperature during a substantial period of time, the container comprising an insulated first can-shaped vessel (2) filled with a solid-to-liquid phase transforming refrigerant material (5). In a first step of the method a multilayer insulation is baked under vacuum and arranged about said first vessel (2) by wrapping so that it encloses said first vessel on all sides, in a second step said first vessel is inserted under vacuum into an outer vessel, in a third step the bottom part (18) and the cover part (19) of the container are welded together under vacuum. The device for manufacturing the container comprises a high vacuum chamber (28) provided with an input magazine (32) and valve (32b) for said first vessel (2), a wrapper machine (29) for wrapping said first vessel with insulation and a welding station located above said wrapper machine (29) for welding the container parts (18, 19) under vacuum.

5 Claims, 7 Drawing Sheets

DEVICE FOR WRAPPING AND WELDING UNDER VACUUM, USED IN THE MANUFACTURE OF A THERMALLY INSULATED CONTAINER

The present invention refers to a method and a device for manufacturing a thermally insulated container for storing and transportating material such as vaccine, biological material or the like requiring a substantial constant temperature during a time of several months, a device for comprising a first can-shaped vessel filled with a solid-to-liquid phase transforming refrigerant material in which the material to be cooled is placed in a multi-layer insulation comprising layers of porous material of low thermal conductivity under vacuum alternating with layers of radiation shields about said first vessel, so that it encloses said first vessel on all sides, and a second can shaped vessel, in which said insulated first vessel is arranged.

When storing and/or transporting biological and chemical materials one has to consider that these materials will change with time, if they are not stored at a certain, often low, temperature. This is mainly a problem in the developing countries, where the transport of heat sensitive material such as vaccines, serum, blood, blood plasma and some enzyme compounds is carried out in an environment, of rather high temperatures. In addition the transport routes are often long and in bad condition, which means that the transport will last long. In the developing countries it is also unusual that vaccines and the like are manufactured in the country, but the demand is almost always covered by import from different industrialized countries. This means that the transport routes will become still longer.

More than 90% of all vaccines require storing at temperatures between +2° and +8° C. and are destroyed or degraded rather fast at higher temperatures and also by freezing. As vaccines and the like are very sensitive and as the transport routes are long and hard, a high degree of all vaccines are degraded along the transport route before they reach the final user in the developing country. Today the vaccines are transported between different stations, of which at least the bigger ones are equipped with cooling and freezing plants. These cooling and freezing plants are powered with electric power or alternatively by means of liquid petroleum, gas or kerosene and they are rather sensitive to disturbance. Due to uncertain electric power supply networks in the developing countries it is for example not unusual with long power failures.

With the cooling plants which exist today it is therefore important that the transport is carried out as fast as possible. This means that vaccines are flown as far as possible into the developing countries and a net of intermediate storing stations is built up. This of course is expensive and requires a well organized chain of cooling plants.

In EP-A-0157751 there is disclosed a container of the above mentioned kind, which is capable of keeping the material held therein at a substantially constant temperature or within a certain temperature interval during a time of six months if necessary.

Purpose and Most Important Features of the Invention

The purpose of the present invention is to provide a device for manufacturing a thermally insulated container of the above mentioned type. This is achieved according to the invention by a device comprising a vacuum chamber in which there is arranged a wrapper machine for wrapping said insulation material about said inner vessel, further comprising a vacuum furnace to treat said insulation material before wrapping said inner vessel, means for placing the insulated inner vessel in the outer and a welding station for hermetically sealing said outer vessel through welding.

DESCRIPTION OF EMBODIMENTS

Figure 1:
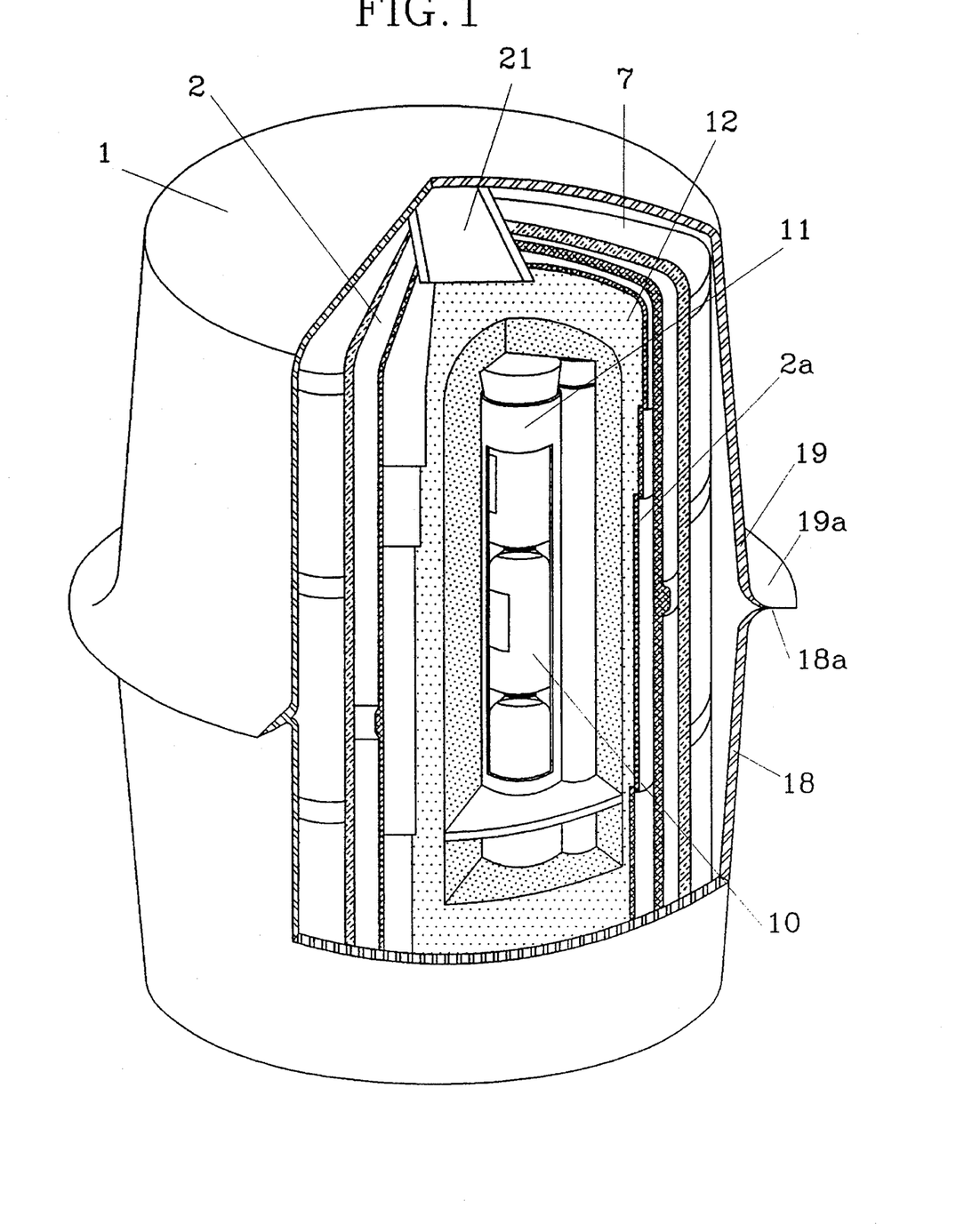
FIG. 1 shows a cross-section through a container consisting of inner and outer containers with insulating material therebetween.

In FIG. 1 is shown a thermally insulated container comprising an inner vessel 2, containing the material 10 to be transported such as vaccine enclosed by a plastic tube 11 which in turn is surrounded by phase change refrigerating material 12 contained in a container for phase change material 2a. The inner vessel 2 is sealed by welding at atmospheric pressure.

A thermal insulation 7 comprising a multilayer insulation in the form of several layers insulating material being arranged outside the vessel 2. The insulating material completely encloses the inner vessel 2 under vacuum. A separate layer is constituted by a spacer web 8 of a low thermal conductivity e.g. glass fiber paper alternating with a radiation shield 9 of e.g. aluminium foil. In a preferred embodiment the spacer web has a width of 90 mm and the aluminium foil a width of 70 mm. An outer vessel 1 is arranged outside the insulation. The outer vessel is made preferably of stainless steel, and consists of cylindrical symmetric flanged halves, a bottom half 18 and a cover half 19 which are attached to each other at the flanges 18a and 19a respectively by welding under vacuum after the insulated inner vessel 2 has been placed in the outer vessel 1, so that a hermetically sealed and evacuated outer vessel is provided. The multilayer insulation 7 should have a thickness of at least 20 mm.

The outer vessel 1 is further provided with a so called getter pump 21 for removing any residues of gas in the spacer material 8. The getter material is activated by electric heating under vacuum for a short period.

Figure 2:
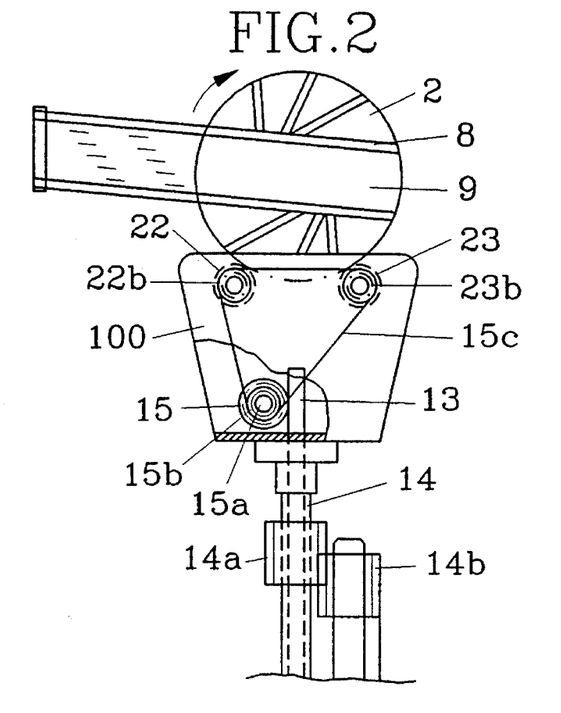
FIG. 2 shows a frontal view partly sectioned of a device according to the invention for wrapping insulating material about the inner container.
Figure 3:
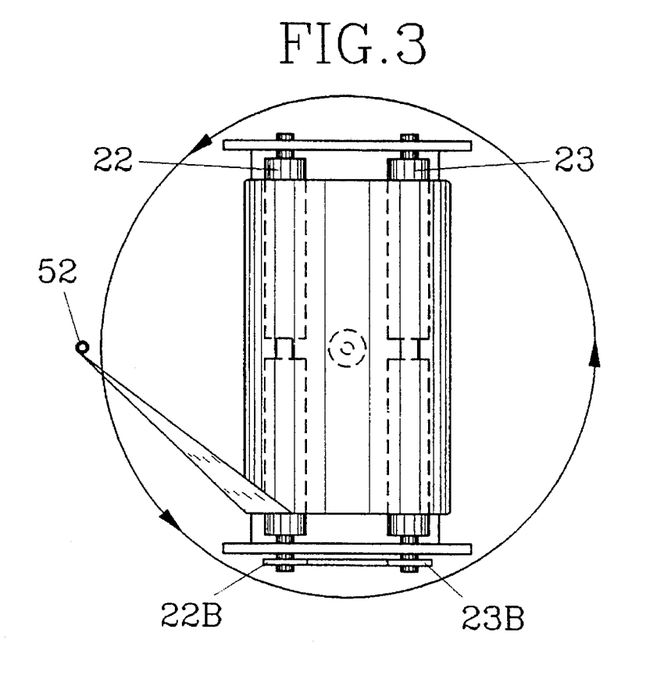
FIG. 3 is a view from the top of the device according to FIG. 2.

In FIGS. 2 and 3 is disclosed a device for wrapping the cylindric inner vessel 2 with and completely enclosing it in insulating material. The device comprises a rotateable housing 100 supported on a vertical main shaft 14 in which housing horizontal drive rolls 22 and 23 supporting the cylindric vessel 2 are provided. The drive rolls 22 and 23 are provided with pinions 22b and 23b, said pinions being driven by a common chain 15c coupled via a pinion 15b on the output shaft 15a of a centrally positioned worm gear 15 which input is driven by a shaft 13 internally coaxial with the main shaft 14. The main shaft 14 is driven by gears 14a and 14b which can be displaced with respect to each other axially 60–70 mm to make possible hoisting of the housing 100 to a welding position in which outer vessel is to be welded.

In the welding position the drive rolls 22 and 23 are decoupled from the drive system 13, 15, 15a, 15b, 15c, said drive rolls being used as support rolls driven by the vessel 1 the rotation of which is caused by the action of two welding electrodes as will be described further in the specification.

Figure 4:
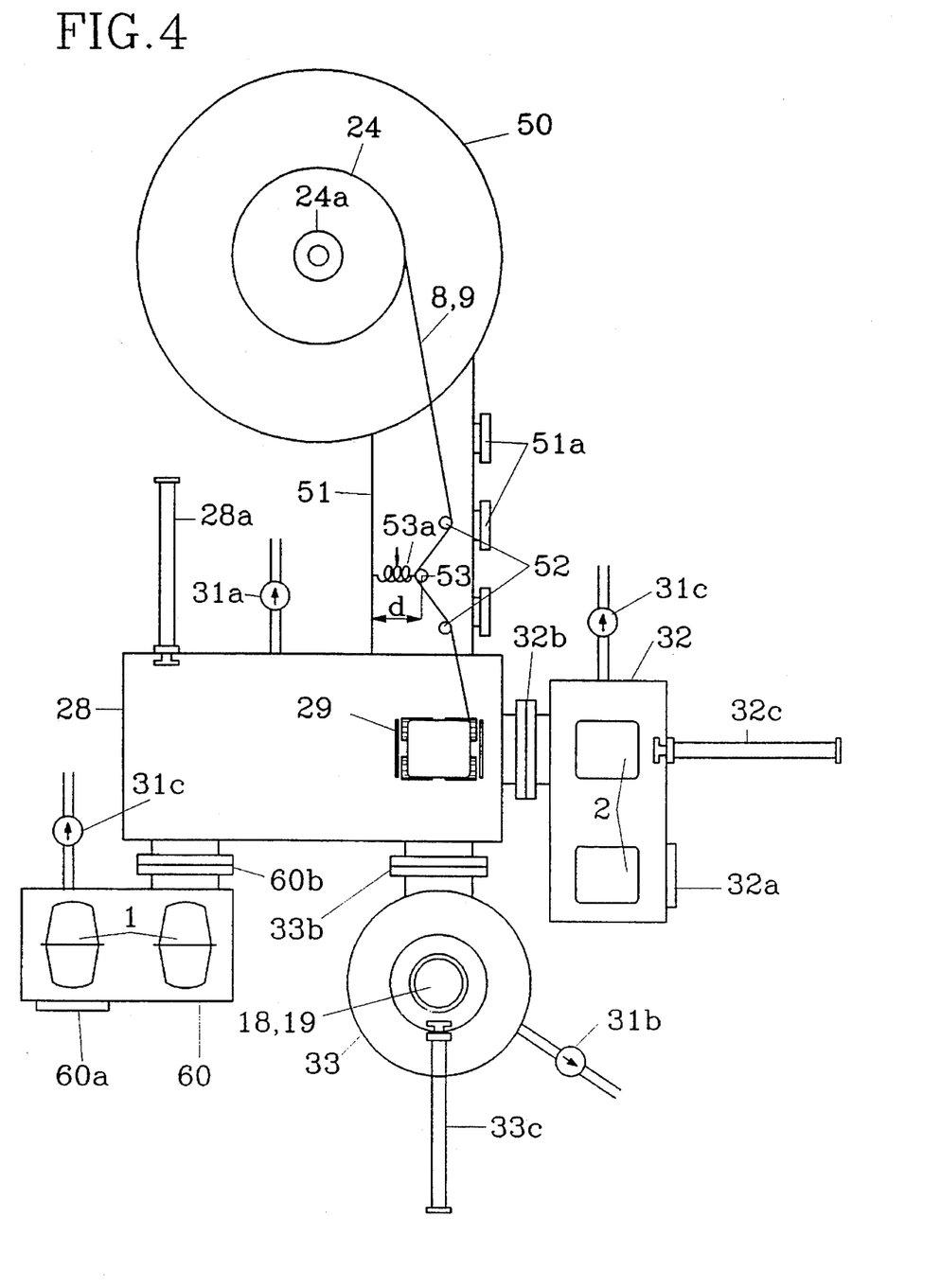
FIG. 4 shows schematically a general view of the device for manufacturing a thermally insulated container according to a preferred embodiment of the invention.

With reference to FIG. 4 the insulating material, which in this case may comprise a double-layer material, as described above is arranged on a supply roll 24 in a vacuum oven 50 for heat processing. Before wrapping the insulation material is baked at a temperature of 350° C. for four hours in order to reduce the moisture content. The web of insulating material passes from the vacuum oven via a transport channel 51 provided with guide rollers 52 and a resiliently supported by a control roll 53 resiliently supported in the transport chamber wall and provided with a displacement sensor e.g. a potentiometer 53a to measure the distance d between the transport channel wall and the control roll. The insulation material is very brittle and thus sensitive to tension and therefore the peripheral velocity of the supply roll should follow the changes in periferal velocity of the wrapped inner vessel. In order to maintain the tension of the insulation material constant, the unwrapping action of the supply roll 24 is provided by a motor 24a controlled by a PID-control system linked to the displacement sensor of the control roll. The transport action of the web of insulation material can be supervised through the windows 51a.

The displacement rotation of the vessel 2 created by the rolls 22,23 as well as the winding action of the main shaft 14 will cause the insulating web material 8, 9 to be wrapped about the vessel 2 in a substantially spiral configuration with overlapping layers. The wrapping is continued until the insulating material completely surrounds the surfaces of the vessel 2 including its curved side surfaces and end surface with a desired number of layers. After fixation of the end of the insulating material, the insulated vessel 2 is then manipulated into one of the container halves by means of a number pneumatic cylinders 33c. All these operations are performed in vacuum.

In FIG. 4 is shown schematically a vacuum main chamber 28 according to a preferred embodiment of the invention in which there is arranged a wrapping machine 29 principally of the type described above and a welding station 30 for welding the outer vessel 1.

Three different types of vacuum pumps are used for providing vacuum to the entire system of vacuum valves, vacuum chambers and lead-through bushings. A cryo-pump 31a is used to bring vacuum down to $10^{-5}$ torr, and a jet pump 31b is used for the vacuum oven for the outer container halves 18, 19 and brings the vacuum down to $10^{-4}$ torr. A number of mechanical vacuum pumps 31c are used to reduce the pressure down to $10^{-2}$ torr in the input and output magazines and to less than 1 torr in the lead-through bushings.

Figure 5:
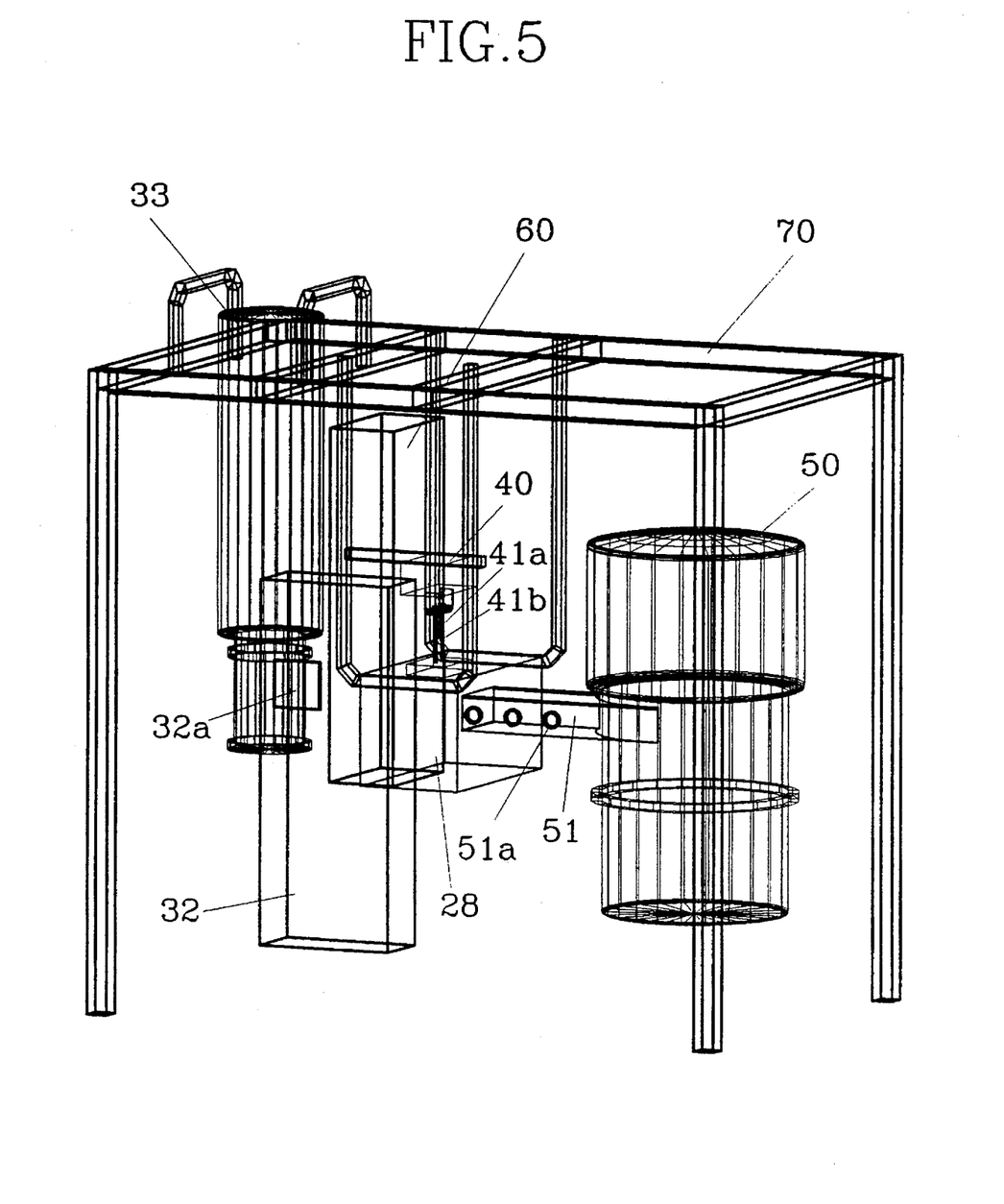
FIG. 5 shows a perspective side elevational view of the device for manufacturing a thermally insulated container according to FIG. 4.

With reference to FIGS. 4 and 5 the inner vessel 2 sealed and provided with the material to be transported is then passed through a door 32a of an input magazine 32 containing a number of inner vessels and and by means of a bucket conveyor positioned in front of a vacuum valve 32b, and by means of a pneumatic cylinder 31d is transferred into the vacuum chamber 28. The inner vessel is passed to the wrapper machine 29 and wrapped with insulating material 8, 9.

After the wrapping operation the insulated inner vessel 2 is placed in the outer vessel 1. The container halves 18, 19 which form the outer vessel are degassed in a vacuum oven 33 pushed by means of a number of pneumatic cylinders 33c (only the outlines of one cylinder is shown) on a slide path into the vacuum chamber 28. The container halves 18,19 are tilted by said pneumatic cylinders 33c to cover the insulated inner vessel and be positioned on the rolls 22,23 of the wrapping machine 29.

Figure 6:
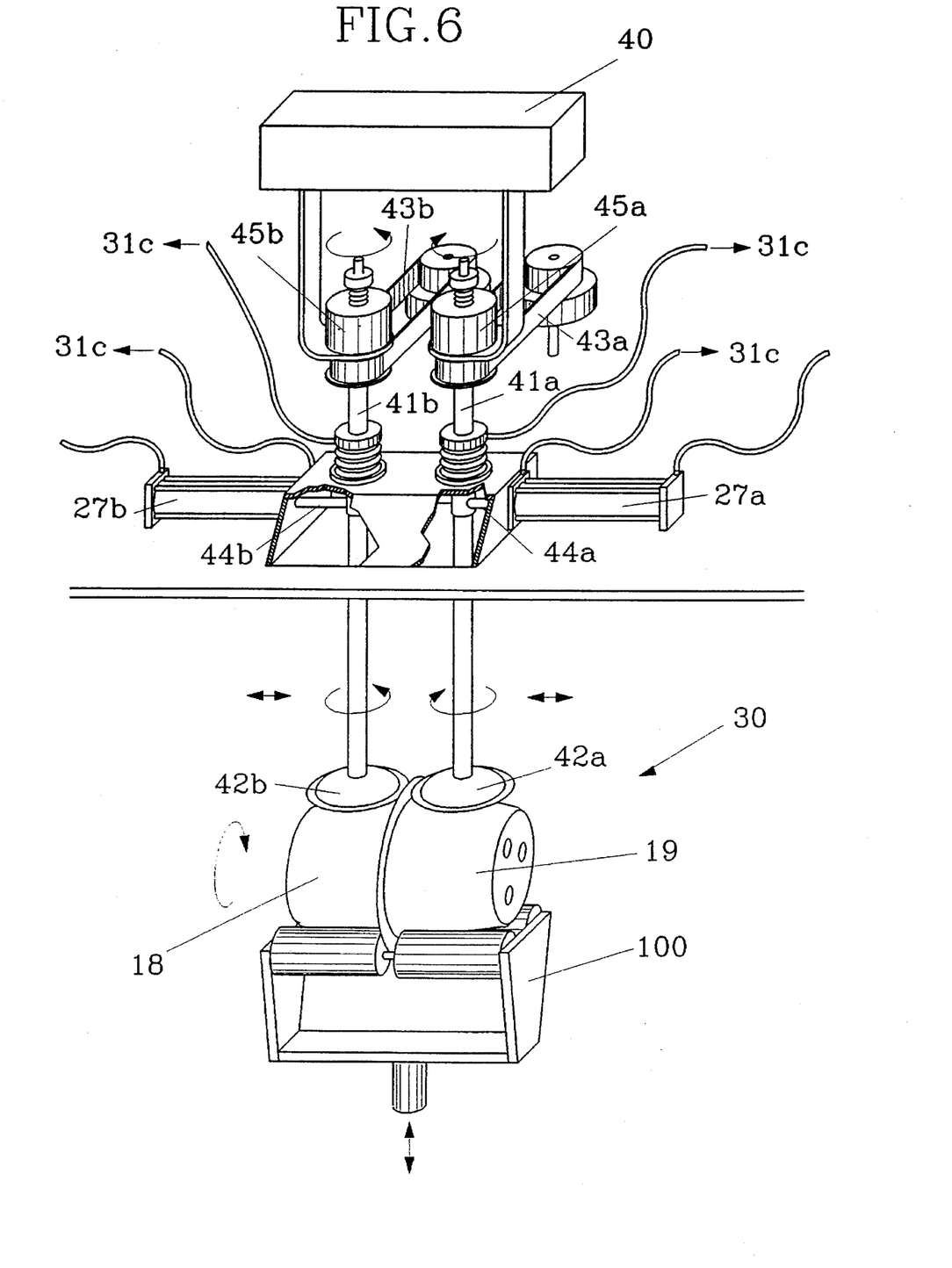
FIG. 6 shows schematically a first embodiment of the vacuum welding station according to the invention comprising resistance welding.

With reference to FIG. 6 the welding can be performed by resistance welding. The welding transformer 40 is arranged outside the main vacuum chamber 28 in a rack 70 and two electrical conductors 41a and 41b are passed into the vacuum chamber 28 via vacuum lead-through bushings supplied with a pre-evacuation of 1 mbar. The conductors 41a and 41b form drive shafts for two welding roll electrodes 42a and 42b respectively. The drive shafts 41a and 41b are driven by a drive system (partly shown) via transmissions 43a and 43b.

In the welding operation the rims 18a,19a of the container halves 18,19 which are to be welded are clamped between the roll electrodes 42a,42b situated just above the wrapping machine The roll electrodes are rotated by means of shafts 44a and 44b connected to pressure cylinders 27a, 27b via lead- through bushings. In the welding operation a current is applied (about 9000 Amps) via rotating connections 45a and 45b from the transformer 40 while the electrodes are rotated driving the container halves on the support rolls 22 and 23 which contain automatic decoupling mechanisms. Thus the container halves are welded together inside the vacuum chamber.

Figure 7:
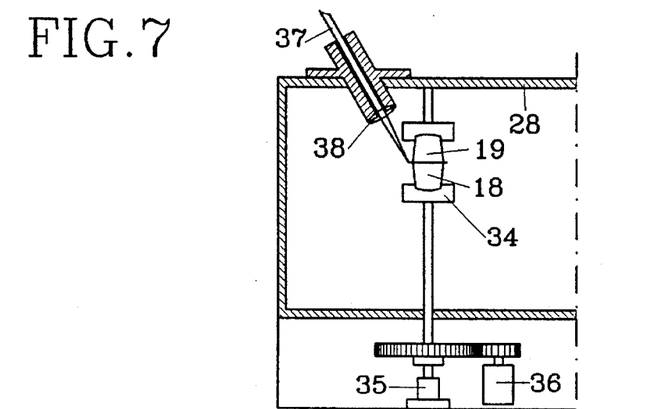
FIG. 7 shows schematically a second embodiment of the vacuum welding station comprising laser beam welding.

With reference to FIG. 7, the joint between the container halves 18, 19 can also be sealed by laser welding. The laser beam 37 is first passed through a window of ZnSe and is then focused by a focusing lens 38 or parabolic mirrors being less sensitive to sputtering by diversion of plasma in the welding zone. The container assembly 18,19 is rotated by a drive system consisting of the drive 35 and the drive motor 36.

After the welding operation has been completed the containers are passed to an output magazine 60 via a vacuum valve 60b by means of a pneumatic cylinder. The structure of the output magazine is similar to that of the input magazine.

The results of a study of the efficiency of an insulated container produced in a manufacturing device according to the invention is shown in FIGS. 8a–8d.

The thermal performance of the super-insulated container is closely related to the "secure life" of the transported products. Secure life is measured by the number of days or months for the internal temperature of the container to be maintained in the range of $-1°$ to $+4°$ C. It is clear that the secure life can vary with the apparent thermal conductivity of the insulation system, the latent heat of the phase change material, the weight of the phase change material and boundary conditions. Thus it has been of special interest to study the influences of a number of parameters on the secure life. In the present study, four parameters were considered: emissivity of the radiation shield, $\epsilon$, residual gas pressure, P, layer density N, and hot boundary temperature, $T_0$.

Figure 8A:
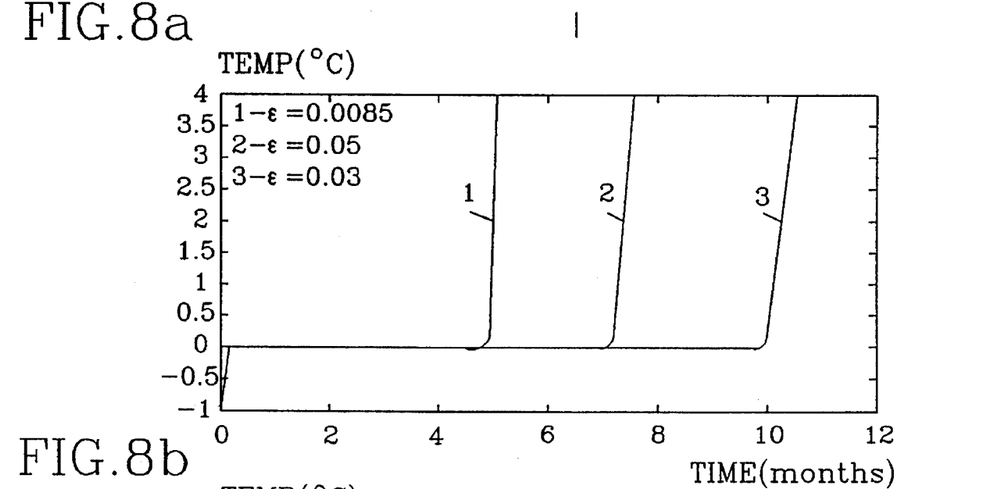
FIGS. 8a–8d show the thermal performance of an insulated container manufactured in a device according to the invention.
Figure 8B:
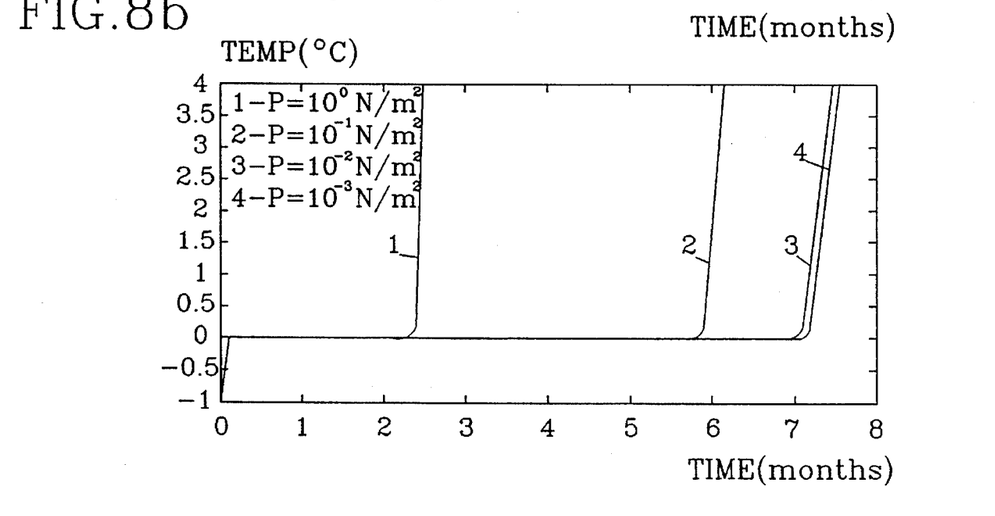

FIG. 8a shows the predicted secure life for the transported products with different emissivity for the radiation shield. Other parameters are constant and equal to $T_0=30°$ C., $P=10^{-3}$ N/m$^2$, N=20 1/cm FIG. 8b shows variation of the secure life for the transported products by changing the residual gas pressure. Other parameters are constant and equal to N=20 1/cm $T_0=30°$ C. and $\epsilon=0,05$.

Figure 8C:
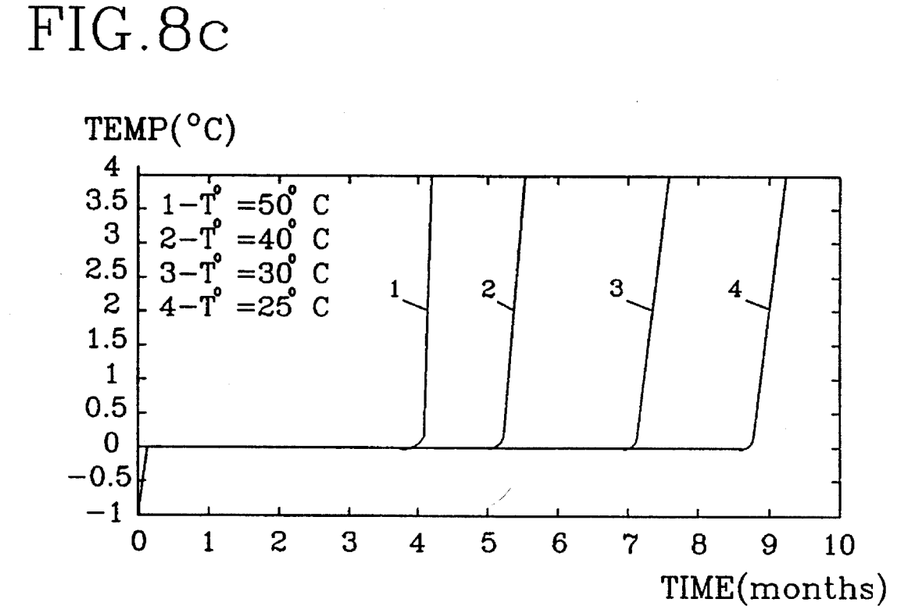
Figure 8D:
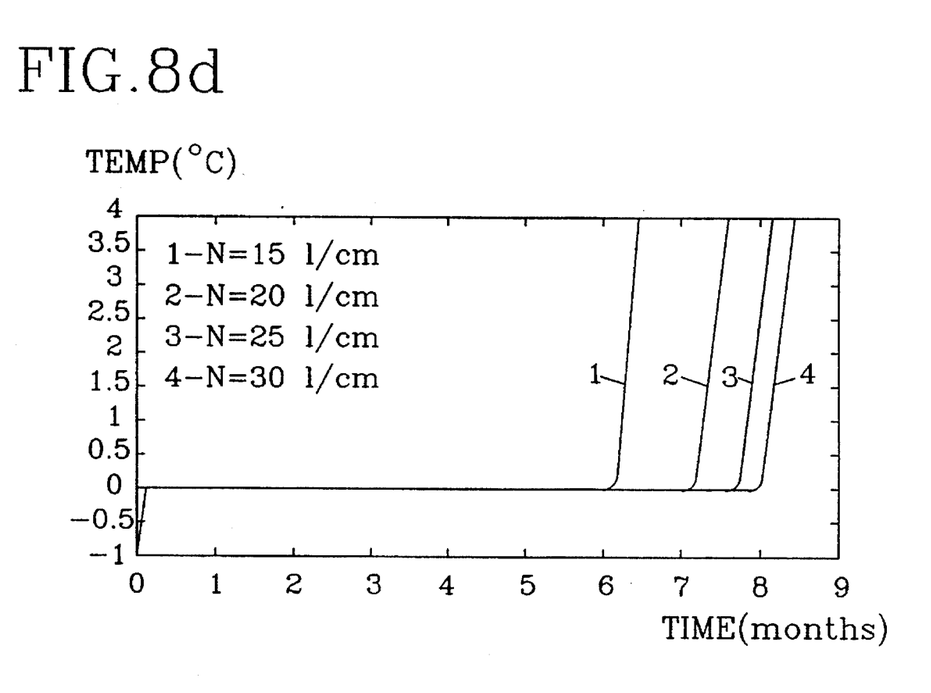

FIG. 8c shows the influence of the hot boundary temperature on the secure life for the transported products on the number of layers. Other parameters are constant and equal to $P=10^{-3}$N/m$^2$, $\epsilon=0,05$ and N=20 1/cm FIG. 8d shows the dependence of the secure life for the transported products on the number of layers. Other parameters are constant and equal to $P=10^{-3}$ N/m$^2$, $T_0=30°$ C. and $\epsilon=0,05$ As shown in FIGS. 8a–d the phase change material provides a constant temperature for a very long period of time inside the inner container. During this time, the heat leak through the system is absorbed by utilising the heat of fusion of the phase change material. In consequence, the temperature will be maintained at the melting temperature during the whole transition process. Its worth noting that it takes a couple of days for the container to reach the steady state condition also after complete phase transformation until the inside temperature exceeds +4° C.

The invention is of course not limited to the above disclosed embodiments, but a number of alternative embodiments are possible within the scope of the claims.

We claim:

1. A device for manufacturing and thermally insulating a transport and storage container, said container comprising an inner vessel placed inside said container for holding a material to be transported and stored, a multi-layer insulated material around said inner vessel, and outer shell halves enclosing said inner vessel and insulation material, said device comprising;

a vacuum pressure chamber with cryo vacuum pump means for evacuating the air from said pressure chamber and for maintaining an operational vacuum pressure;

first vacuum oven means connected to said pressure chamber for heat treatment of said insulation material under vacuum pressure;

a wrapper machine inside said pressure chamber, for wrapping said insulation material in the form of a web about said inner vessel;

holder means inside said pressure chamber for handling the inner vessel during said wrapping;

second vacuum oven means connected to said pressure chamber for heat treatment of outer shell halves under vacuum pressure;

means for placing said outer shell halves over the wrapped inner vessel; and a welding station inside said pressure chamber, for joining and hermetically sealing said outer vessel shell halves under vacuum pressure.

2. A device according to claim 1, and further including an infeed magazine for storing a number of first vessels, a vacuum pump for maintaining a negative pressure in said magazine, and transport means for transferring said inner vessels, one at a time, to the vacuum pressure chamber.

3. A device according to claim 1 and further including, transport means, an outfeed magazine and a vacuum pump, said transport means transferring a completed container from the vacuum pressure chamber to the outfeed magazine, the vacuum pump maintaining a negative pressure in the outfeed magazine.

4. A device as claimed in claim 1, wherein the container shell halves each include rims, and the wrapper machine has drive rolls, and wherein said welding station comprises a resistance weld having a pair of electrode shafts passed into the vacuum pressure chamber through vacuum inlets, means for clamping the rims of the container parts, the drive rolls of said wrapper machine supporting said container parts, and roller electrodes connected to said shafts for driving the container parts between said roller electrodes at the welding of the outer vessel.

5. A device as claimed in claim 1, wherein said welding station comprises a laser weld for passing a laser beam into the vacuum pressure chamber via a window of ZnSe, and focusing means including a lens or a parabolic mirror for focusing the laser beam.

* * * * *